July 19, 1955
H. E. WURZBACH
2,713,415
VIBRATORY CONVEYOR FOR HOT MATERIALS
Filed Dec. 9, 1953
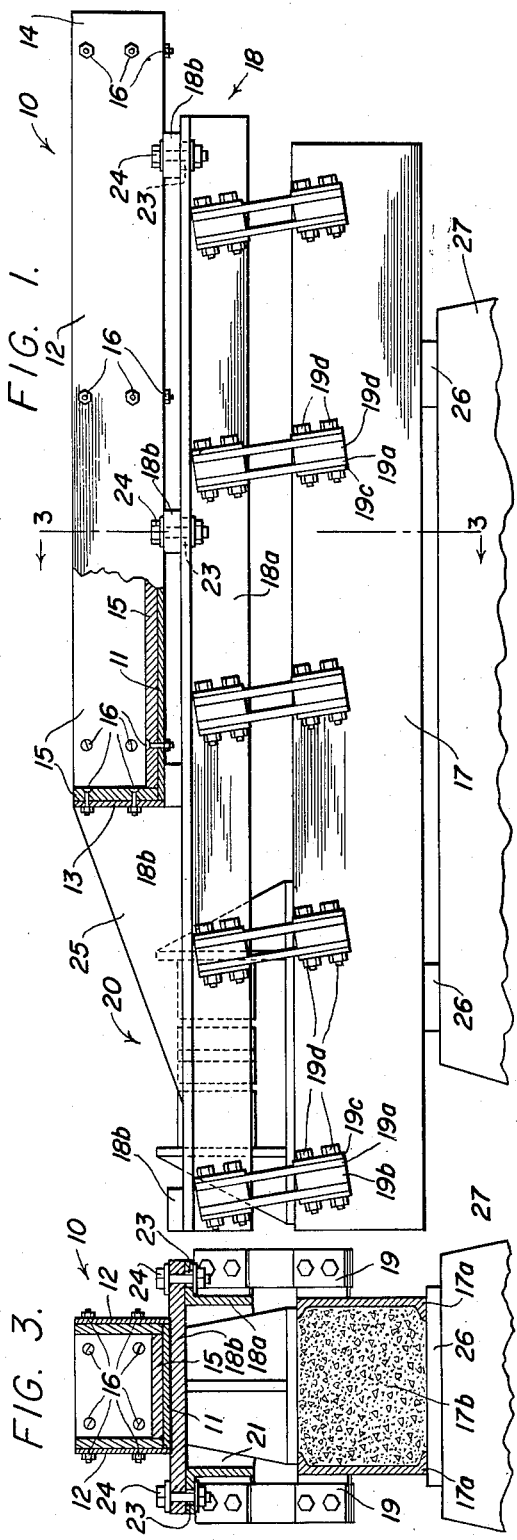
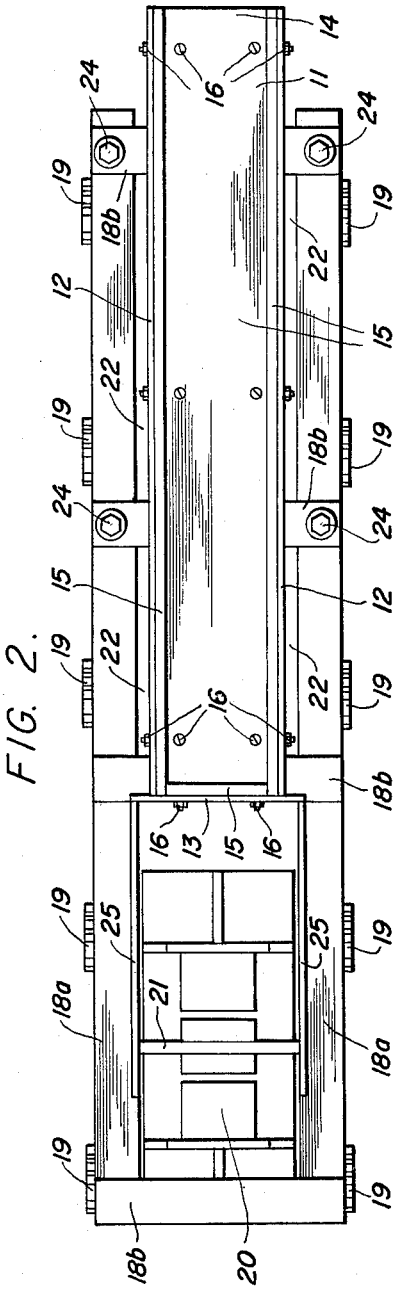
Inventor:
HUGH E. WURZBACH,
By H. Mallinckrodt and
Philip A. Mallinckrodt.
Attorneys.

United States Patent Office 2,713,415
Patented July 19, 1955

2,713,415

VIBRATORY CONVEYOR FOR HOT MATERIALS

Hugh E. Wurzbach, Magna, Utah

Application December 9, 1953, Serial No. 397,213

2 Claims. (Cl. 198—220)

This invention relates to vibratory conveyors as commonly constructed with a plurality of cantilever supports or reeds serving to mount a conveyor deck structure relative to a suitable base for longitudinal vibratory movement.

Vibratory conveyors of this general type have heretofore never been capable of satisfactory use for conveying hot materials. It has been found that the tune of such conveyors is rapidly lost, and that conveying action is seriously impaired by the consequent lack of tune in the vibratory system.

The principal object of this invention, then, is to provide a vibratory conveyor which is capable of being used over extended periods of time to convey hot materials, without losing tune or otherwise setting up discordant vibrations destructive to the efficiency of the desired conveying action.

An outstanding feature of the invention is the manner in which the conveyor trough or pan or other form of conveyor deck is mounted for the execution of vibratory motion.

Thus, in accordance with the invention, the conveyor deck structure is mounted upon an intermediate chassis, which, in turn, is mounted on a suitable supporting base by means of a plurality of customary cantilever supports or reeds.

Furthermore, the conveyor deck structure is rigidly fastened at only one of its ends to the intermediate chassis, thereby being free to expand and contract lengthwise without impairing the tune of the cantilever supports or reeds.

Additional advantageous, though optional, features reside in the spacing of the conveyor deck structure from the chassis so as to obtain an insulating effect, and in providing the conveyor deck structure with a removable and replaceable, heat-resistant lining for its working surfaces.

Additional objects and features of the invention will become apparent from the following detailed description of the preferred specific embodiment illustrated by way of example in the accompanying drawing.

In the drawing:

Fig. 1 represents a side elevation;

Fig. 2, a top plan; and

Fig. 3, a transverse vertical section taken along the line 3—3 of Fig. 1.

Referring to the drawing:

The illustrated embodiment is especially adapted for use as a feeder for hot materials deposited at one end of the conveyor deck by any suitable transfer device (not shown) and advanced to the discharge end of the conveyor deck at a controlled speed governed by the rate of vibration of such conveyor deck.

The conveyor deck may be arranged either horizontally, as shown, or at any practical slope, upwardly or downwardly, in accordance with customary practice.

In the form illustrated, the vibratory conveyor of the invention comprises a conveyor deck 10 defined by a conveyor deck structure of trough-like character having an elongate bottom wall 11, mutually spaced elongate side walls, indicated 12, respectively, and an end wall 13 extending across its feed end, the opposite end 14 being open for the discharge, into any suitable receiving means (not shown), of the material fed to the conveyor deck adjacent the end wall 13. Such structure is advantageously made up, in the main, by bending sheet steel into the desired trough-like or channel formation.

The interior of this trough-like structure is preferably, and as an optional feature of the invention, lined with removable and replaceable slabs 15 of some heat-resistant material, which may vary in accordance with the particular material to be handled by the conveyor. Where hot metallurgical materials are to be handled, these slabs are preferably a cast alloy having high nickel and chromium content. They are securely fastened to the interior wall faces of the conveyor deck structure, as, for example, by means of bolts 16 having their heads countersunk in the material of the slab.

The conveyor deck structure as above described is mounted for longitudinal vibratory reciprocation relative to an elongate base 17 by means of an intermediate chassis 18, and, as a feature of the invention, has only one of its ends rigidly secured to such chassis.

As illustrated, the chassis 18 is made up of structural steel angles, indicated 18a, respectively, spaced apart in back-to-back, parallel relationship, and securely fastened in such relationship by a plurality of longitudinally spaced cross bars, indicated 18b, respectively.

The base 17 has a length corresponding approximately to the length of the chassis 18, and is preferably made up of structural steel channels 17a embracing a mass of concrete 17b, the whole preferably having a weight two or more times that of the conveyor deck structure and chassis combined.

The chassis 18 is resiliently mounted on the base 17 by means of a plurality of cantilever supports or reeds 19, which, as here illustrated, are preferably of the double type described in detail and claimed in my copending application Serial No. 394,625, filed November 27, 1953, entitled "Electromagnetic Vibratory Conveyor," the same being made up of a pair of mutually spaced reed members, indicated 19a, respectively, having opposite sets of ends spaced apart by and fastened to respective brackets 19b which project outwardly from fixed securement to the chassis 18 and the base 17, respectively, face plates 19c and bolts 19d serving as the fastening agents in each instance.

The chassis 18 is driven by any suitable vibratory motor 20, preferably by an electromagnetic vibratory motor of the double, opposed type disclosed in U. S. Patent No. 2,071,373 and No. 2,102,826 issued jointly to Clyde H. Konold and myself under dates of February 23, 1937 and December 21, 1937, respectively, and preferably positioned within the rearward end of the chassis structure in conformity with the disclosure of my aforementioned copending application for patent Serial No. 394,625, the armature bar 21 of such motor extending between and being rigidly secured to the structural angles 18a as a cross bar.

The conveyor deck structure is fastened to the chassis 18 forwardly of the vibratory motor 20 by means of the several cross bars 18b. For this purpose, it is preferably welded rigidly to the several cross bars, it being noted that the width of such conveyor deck structure is preferably sufficiently less than the distance between the structural angles 18a of the chassis, to leave elongate passages 22 at opposite sides for the free flow of air about the conveyor deck structure, thereby effectively insulating the greater extent of such structure from the chassis on which it is supported.

In order to accommodate expansion and contraction of the conveyor deck structure, without in any way effecting the tune of the several cantilever supports or reeds 19, only the rearmost cross bar 18b is secured in fixed relationship to the longitudinal members 18a of the chassis. For this purpose, such rearmost cross bar 18b is preferably welded directly to the structural angles 18a. The remaining cross bars 18b are firmly fastened to such longitudinal members 18a of the chassis, but by means accommodating the longitudinal expansion and contraction to which the conveyor deck structure is subject under the prescribed conditions of use.

Thus, each of those cross bars 18b which are placed forwardly of the rearmost rigidly affixed cross bar is here provided at opposite ends with receiving openings for bolts 24, and the longitudinal chassis members 18a are provided with correspondingly positioned but longitudinally elongate slots 23.

While cinching of the nuts of bolts 24 effects firm securement of the forward reach of the conveyor deck structure to the chassis, it does not preclude longitudinal expansion and contraction of such conveyor deck structure relative to the chassis.

Rearwardly extending gusset plates 25 at opposite sides of the conveyor deck structure are preferably provided for enhancing the rigid securement of its rearward end to the chassis.

While the base 17 may be mounted in any suitable fashion, I prefer to interpose resilient pads 26 of gum rubber or the like between it and the foundation structure 27.

Whereas this invention is here illustrated and described with respect to a particular preferred construction thereof, it should be realized that various changes may be made therein and other constructions adopted without departing from the scope of the invention as set forth herein and in the claims which here follow.

I claim:

1. A vibratory conveyor for hot materials, comprising an elongate chassis made up of a pair of elongate side members disposed in mutually spaced, side-by-side, opposed relationship, and a plurality of transversely extending, longitudinally spaced cross bars; an elongate conveyor deck structure extending longitudinally with and mounted in spaced, superimposed relationship upon said chassis; an elongate base for the chassis; a plurality of cantilever supports resiliently supporting the chassis on the base for vibratory reciprocation relative to the latter; vibratory motor means connected with the chassis for imparting the said vibratory reciprocation thereto; and means fastening said deck structure to the chassis, said means including a rigid connection between one of the said cross bars of the chassis and one end of said deck structure, and additional, longitudinally free connections between succeeding cross bars of the chassis and said deck structure along the length of the latter, said longitudinally free connections each comprising a bolt and nut assembly and registering openings therefor formed through the cross bar and the side member of the chassis, one of said receiving openings being elongate longitudinally of the conveyor deck structure, and the cross bar being rigidly secured to the conveyor deck structure, but, except for said connections, being free relative to the chassis, whereby longitudinal expansion and contraction movement of said deck structure is permitted relative to said chassis.

2. A vibratory conveyor as set forth in claim 1, wherein the base and the chassis are approximately coextensive longitudinally; wherein the vibratory motor means is supported by the said base at one end thereof, and connects with the chassis between the side members thereof; and wherein the conveyor deck structure is mounted on the chassis beyond the said vibratory motor means, and has its rigid connection with said chassis disposed adjacent the vibratory motor means.

References Cited in the file of this patent

UNITED STATES PATENTS

| | | |
|---|---|---|
| 2,071,373 | Wurzbach et al. | Feb. 23, 1937 |
| 2,115,554 | Harrison | Apr. 26, 1938 |
| 2,671,655 | Osterman et al. | Mar. 9, 1954 |